(12) United States Patent
Gravel et al.

(10) Patent No.: US 7,255,002 B2
(45) Date of Patent: Aug. 14, 2007

(54) TANK SEAL FOR GUIDED WAVE RADAR LEVEL MEASUREMENT

(75) Inventors: James L. Gravel, Prior Lake, MN (US); Mark C. Fandrey, Eden Prairie, MN (US)

(73) Assignee: Rosemount, Inc., Eden Prairie, MN (US)

( * ) Notice: Subject to any disclaimer, the term of this patent is extended or adjusted under 35 U.S.C. 154(b) by 25 days.

(21) Appl. No.: 11/100,768

(22) Filed: Apr. 7, 2005

(65) Prior Publication Data

US 2006/0225499 A1   Oct. 12, 2006

(51) Int. Cl.
*G01F 23/00* (2006.01)

(52) U.S. Cl. .................. 73/290 V; 73/290 R; 73/866.5

(58) Field of Classification Search ............. 73/290 V, 73/290 R
See application file for complete search history.

(56) References Cited

U.S. PATENT DOCUMENTS

| | | | | |
|---|---|---|---|---|
| 4,574,328 A | * | 3/1986 | Maier | 361/284 |
| 4,757,292 A | * | 7/1988 | Basil et al. | 333/244 |
| 5,217,596 A | * | 6/1993 | Indig et al. | 204/435 |
| 5,249,463 A | * | 10/1993 | Willson et al. | 73/290 R |
| 5,554,936 A | | 9/1996 | Mohr | 324/642 |
| 5,661,251 A | * | 8/1997 | Cummings et al. | 73/866.5 |
| 5,781,019 A | | 7/1998 | Telder | 324/643 |
| 5,827,985 A | | 10/1998 | Grieger et al. | 73/866.5 |
| 5,851,083 A | | 12/1998 | Palan | 403/337 |
| 5,877,663 A | | 3/1999 | Palan et al. | 333/252 |
| 5,907,112 A | * | 5/1999 | Queyquep | 73/866.5 |
| 5,943,908 A | | 8/1999 | Innes et al. | 73/290 |
| 6,148,681 A | * | 11/2000 | Gravel et al. | 73/866.5 |
| 6,247,362 B1 | | 6/2001 | Soroka | 73/290 |
| 6,386,055 B1 | * | 5/2002 | Eason | 73/866.5 |
| 6,412,344 B1 | | 7/2002 | Danicich et al. | 73/290 |
| 6,445,192 B1 | | 9/2002 | Lovegren et al. | 324/644 |
| 6,642,807 B1 | | 11/2003 | Gard | 333/24 |
| 6,867,729 B2 | * | 3/2005 | Berry et al. | 342/124 |
| 2002/0011115 A1 | | 1/2002 | Frick | 73/718 |

(Continued)

FOREIGN PATENT DOCUMENTS

| | | |
|---|---|---|
| DE | 10308495 | 9/2004 |
| DE | 10308495 A1 | 9/2004 |
| EP | 0 780 664 | 6/1997 |
| WO | WO 97/12211 | 4/1997 |
| WO | WO 2004/076982 A2 | 9/2004 |

OTHER PUBLICATIONS

Technical Description, Saab TankRadar® REX, "High Precision Tank Gauging System," Saab Rosemount Tank Control, pp. 2-19, Sep. 2001.

(Continued)

*Primary Examiner*—Hezron Williams
*Assistant Examiner*—Rodney Frank
(74) *Attorney, Agent, or Firm*—Westman, Champlin & Kelly, P.A.

(57) ABSTRACT

A microwave level gauge for measuring a level of a process material in a tank includes a ceramic seal and a microwave conductor. The ceramic seal is disposed adjacent to an opening in the tank and adapted to isolate circuitry from the process material. The microwave conductor is electrically coupled to the circuitry and extends through the hermetic seal and into the process material in the tank. The ceramic seal and an isolating adapter cooperate to isolate the microwave conductor from the process fluid and from external forces.

39 Claims, 13 Drawing Sheets

U.S. PATENT DOCUMENTS

| | | |
|---|---|---|
| 2003/0118832 A1 | 6/2003 | Skaling et al. ............... 428/412 |
| 2003/0201842 A1 | 10/2003 | Gard ............................ 333/24 |
| 2005/0132797 A1* | 6/2005 | Klees et al. ................. 73/29 V |
| 2005/0150568 A1 | 7/2005 | Dietmeier .................... 141/95 |

OTHER PUBLICATIONS 2 web pages, Stainless Steels—Alloy Grades, Typical Mechanical Properties of Stainless Steels used for Rebars, May 2, 2003.

1 web page, ALLOY Data, "Carpenter 2205 Stainless," May 2, 2003.

Allegheny Ludlum, Technical Data Blue Sheet, Stainless Steel AL 2205™ Alloy (UNS Designation S31803), 6 pages, 1998.

PCT Invitation to Pay Additional Fees for International Application No. PCT/US2006/011585, filed Mar. 29, 2006. Date of mailing: Jun. 30, 2006.

International Search Report and Written Opinion for International Application No. PCT/US2006/011585 filed on Mar. 29, 2006. Mailing date of May 10, 2006.

* cited by examiner

SECTION 7D-7D'

TANK SEAL FOR GUIDED WAVE RADAR LEVEL MEASUREMENT

BACKGROUND OF THE INVENTION

The present invention relates to a microwave level gauge adapter having a thermal barrier for use with a tank level sensor.

Level gauges are generally used in the process control industry to measure the level of material contained in a tank. As used herein, the term "tank" refers to a container, receptacle, vessel or other device for holding gases, liquids or solids. Radar level gauges are often used to measure process fluids or process solid levels in tanks, where the process materials range from benign materials to severely corrosive or abrasive compounds.

One type of level gauge for measuring a level of material in a tank is called a microwave level gauge. Microwaves are high frequency, short wavelength, electromagnetic waves. Microwaves, because of their short wavelengths, tend to travel in straight lines. This property gives rise to their application in radar, where objects are detected by the reflection of microwaves.

Generally, microwave or radar level gauges transmit an electromagnetic pulse into the materials contained within the tank, and measure the level of the process materials using the reflected pulse. As used herein, the term "microwave" refers to a high-frequency electromagnetic wave. The term "microwave pulse" refers to a microwave signal of short duration that is transmitted on a microwave antenna or conductor. The terms "microwave antenna" and "microwave conductor", as used herein, refer to a conductive structure specifically designed to couple high-frequency electromagnetic energy (or to radiate electromagnetic energy). Typically, the microwave antenna or microwave conductor can both transmit and receive electromagnetic energy.

In a conduction waveguide assembly, the antenna typically extends from a transmitter assembly into the process materials. For example, a microwave pulse travels along the antenna, and is reflected back when the pulse encounters a material with a different dielectric constant. Generally, the pulse is affected by the change in the dielectric constant at the surface of the process material within the tank. Various techniques may be used to analyze the reflected microwave pulse (including, for example, time domain reflectometry).

Since the process materials within the tank tend to be corrosive and are often stored under pressure, there is a process seal positioned between the sensor and the potentially aggressive materials within the tank. Conventionally, an O-ring or a teflon seal was used to isolate the process fluid from the transmitter housing and sensor electronics. In addition to isolating the electronics from the process fluid, such seals were typically constructed of materials selected so as not to cause microwave reflection.

While such seals typically met microwave transmission requirements, the seals were not particularly well-suited for high pressure/temperature applications.

SUMMARY OF THE INVENTION

Disclosed is a microwave level gauge for measuring a level of a process fluid in a tank. The gauge comprises a hollow adapter body extending from a lower portion that is open to the tank to a transmitter mount outside the tank.

The gauge also comprises a connector rod extending from the lower portion and connectable to an antenna in the tank. A primary seal in the lower portion includes a lower support band brazed to an outer surface of a ceramic seal body and welded to the connector rod. The primary seal also includes an upper support band brazed to an outer surface of the seal body and sealingly joined to the adapter body. The primary seal seals the cavity from the tank. Additional conductors couple between the connector rod and the transmitter mount such that microwaves are couplable from the antenna to a transmitter.

DETAILED DESCRIPTION OF THE PREFERRED EMBODIMENTS

Figure 1:
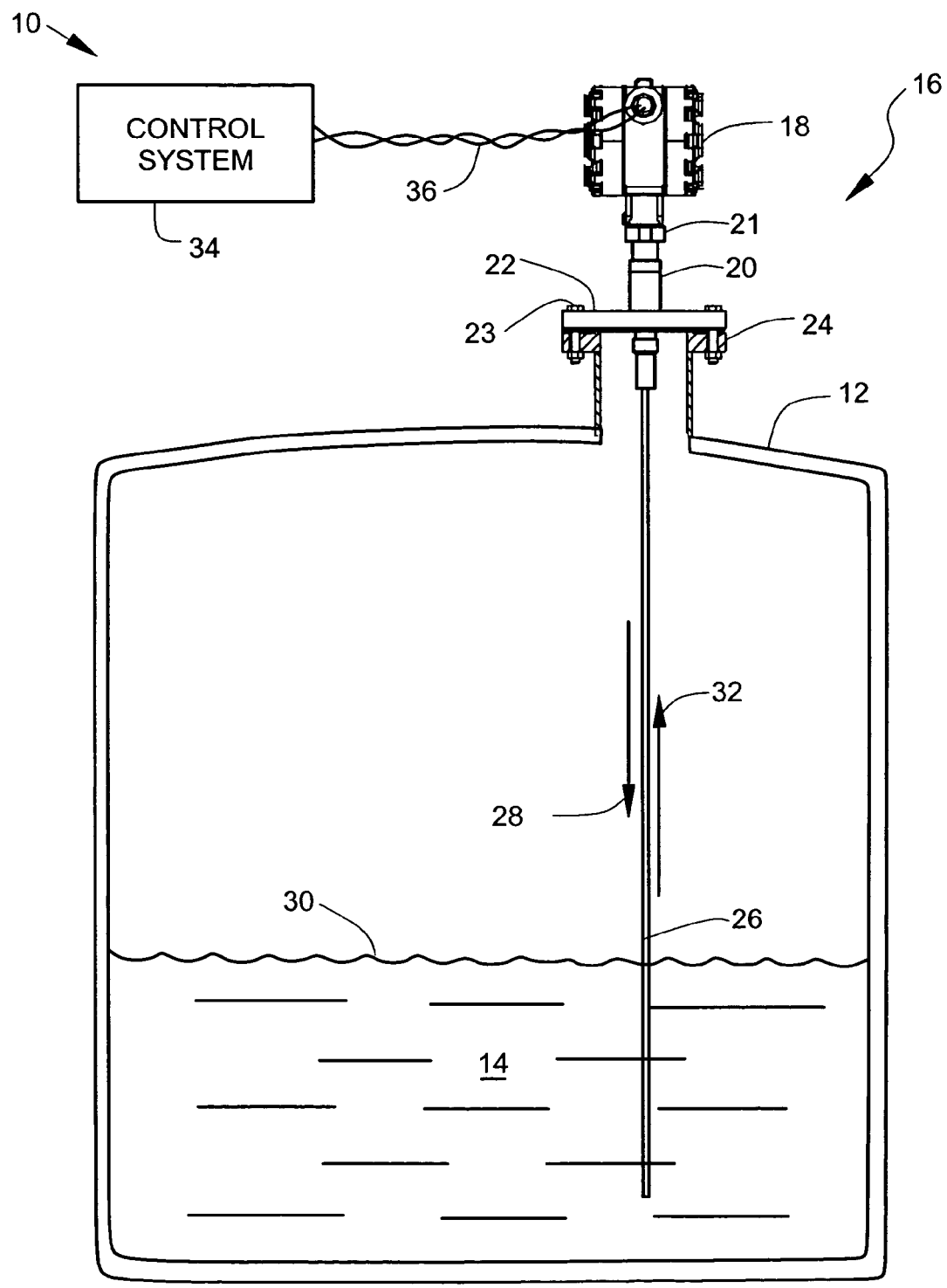
FIG. 1 is a cross-sectional view of a tank in which a first embodiment of a microwave level gauge is installed.

FIG. 1 is an illustration of a tank level monitoring system 10. The system 10 includes a process tank 12, shown in cross-section, which is filled with a process material 14. A microwave level gauge assembly 16 is mounted to the tank 12. Generally, the process tank 12 is filled with the process material 14, the height or level 30 of which is to be measured by the microwave level gauge assembly 16.

The microwave level gauge assembly 16 includes a transmitter housing 18 attached to an adapter body 20 by a threaded coupler nut 21. The threaded coupler nut 21 functions as part of a separation joint so that the transmitter housing 18 can be conveniently removed for servicing. The threaded coupler nut 21 also functions as part of a union joint so that the transmitter housing 18 can be assembled to the adapter body 20 in any rotational position for convenience in connecting an electrical wiring conduit to the transmitter housing 18. The adapter body 20 is coupled to the tank 12 via a flange 22. In this embodiment, the assembly 16 is mounted to the tank 12 at a tank port flange 24, which is at the top of the tank 12. The flange 22 is secured with bolts 23 to the tank port flange 24 and is sealed with a suitable gasket (not illustrated).

Alternatively, the assembly 16 can be mounted to a vertical stand off pipe (not shown), which may be fastened to the top of the tank 12 in place of tank port flange 24. The vertical stand off pipe can be flanged, or alternatively threaded to mate with a correspondingly threaded end on a threaded adapter body.

The assembly 16 also includes a microwave antenna 26. In general, a microwave pulse 28 is transmitted downwardly along the antenna 26 (which generally extends approximately a full depth of the tank 12). A dielectric constant of air in the tank 12 is different from a dielectric constant of the process material 14. When the microwave pulse 28 reaches the surface 30 of the process material 14, the pulse 28 encounters a discontinuity in the dielectric constant around the antenna 26, causing a portion of the microwave energy to be reflected in a reflected microwave pulse 32. The reflected microwave pulse 32 is received by electronics in the transmitter housing 18 and is used to measure the level of the material 14 within the tank 12.

The transmitter housing 18 encloses electronic circuitry for transmitting the microwave pulse 28 and receiving the reflected microwave pulse 32 as explained in more detail below in connection with FIGS. 2-6. The transmitter housing 18 may also include circuitry adapted to condition the sensed microwave pulse 32 into a standardized signal that is sent via a communication link 36 to a control system 34. The standardized signal represents the level 30 of process material 14 in the tank 12. The transmitter housing 18 may also include circuitry adapted to send and receive radiated signals (including a signal representative of the level 30 of material 14 in the tank 12) to and from a control system 34 via a communications link which can be an optical or RF communication medium.

Communications link 36 may be wired, fiber optic or wireless RF. When communications link 36 is wireless, then the circuitry may include a wireless transceiver adapted to send and receive wireless signals. The control system 34 is coupled to the communication link 36 to receive the standardized signal and typically controls the level 30 of process material 14 in the tank 12.

The electronics within the transmitter housing 18 is spaced apart from and thermally and hydrostatically isolated from the process material 14. If the electronics were exposed to the heat or pressure or the corrosive atmosphere contained in the tank 12, the accuracy of the level measurements could be compromised or the electronics could be damaged by exposure to the corrosive atmosphere.

FIGS. 2-6 illustrate several views of portions of the first embodiment of the microwave level gauge assembly 16 of FIG. 1.

Figure 2:
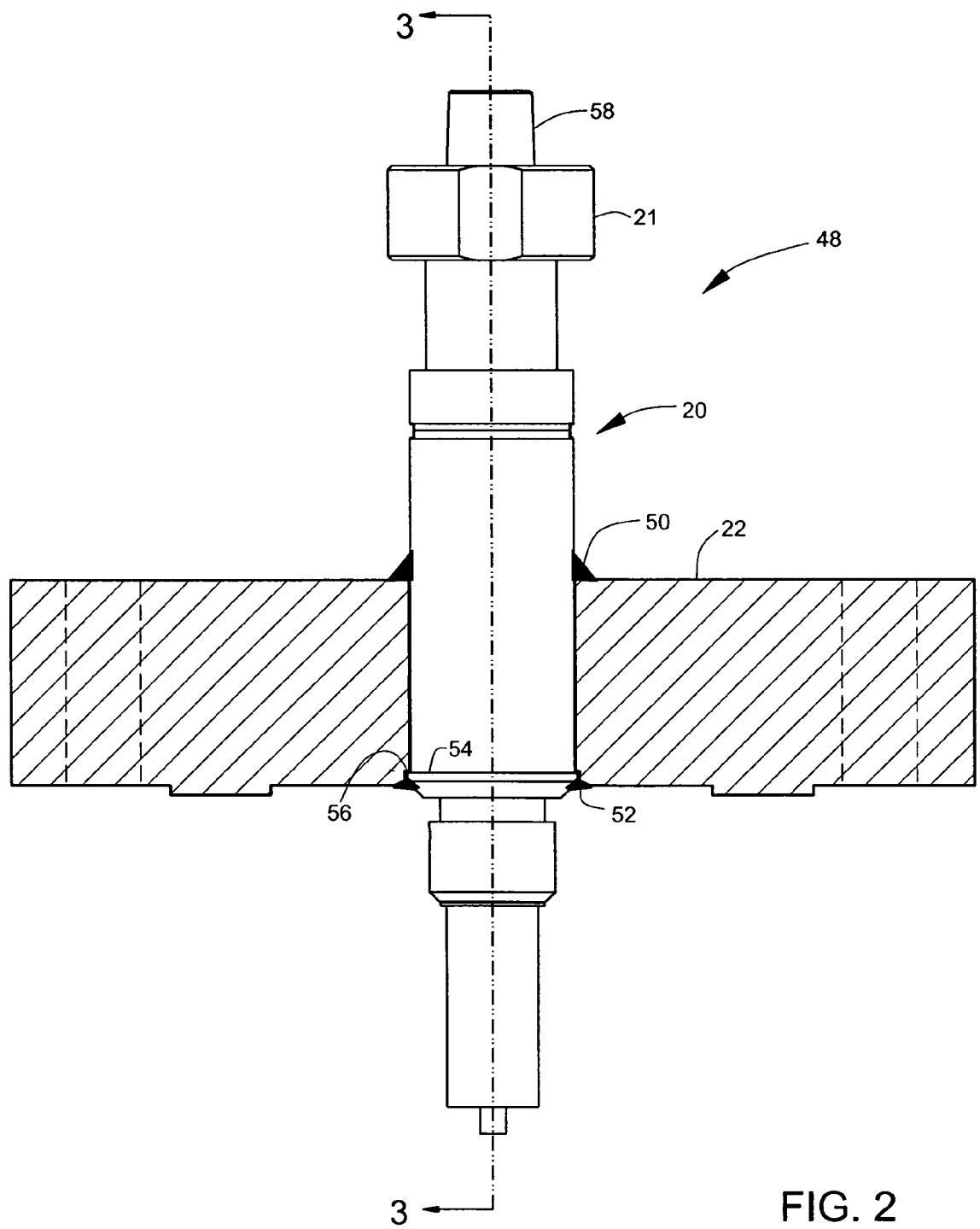
FIGS. 2-6 illustrate several views of portions of the first embodiment of a microwave level gauge.

FIG. 2 illustrates an enlarged view of an assembly 48 of the adapter body 20, the threaded coupler nut 21 and the flange 22 shown in FIG. 1. The adapter body 20 is welded at continuous circumferential welds 50, 52 to the flange 22 to provide leakproof seal. The adapter body 20 includes a protruding circumferential lip 54 that engages a groove 56 in the flange 22. When the tank (FIG. 1) is pressurized, the engagement of the lip 54 with the groove 56 transfers axial force on the adapter body 20 to the flange 22 and provides an increased pressure rating for the seal.

A housing adapter 58, which is part of the transmitter housing 18 (FIG. 1) is rotatably attached to the adapter body 20 by the threaded coupler nut 21. The assembly 48 of FIG. 2 is described in more detail below in connection with FIG. 3.

Figure 3:
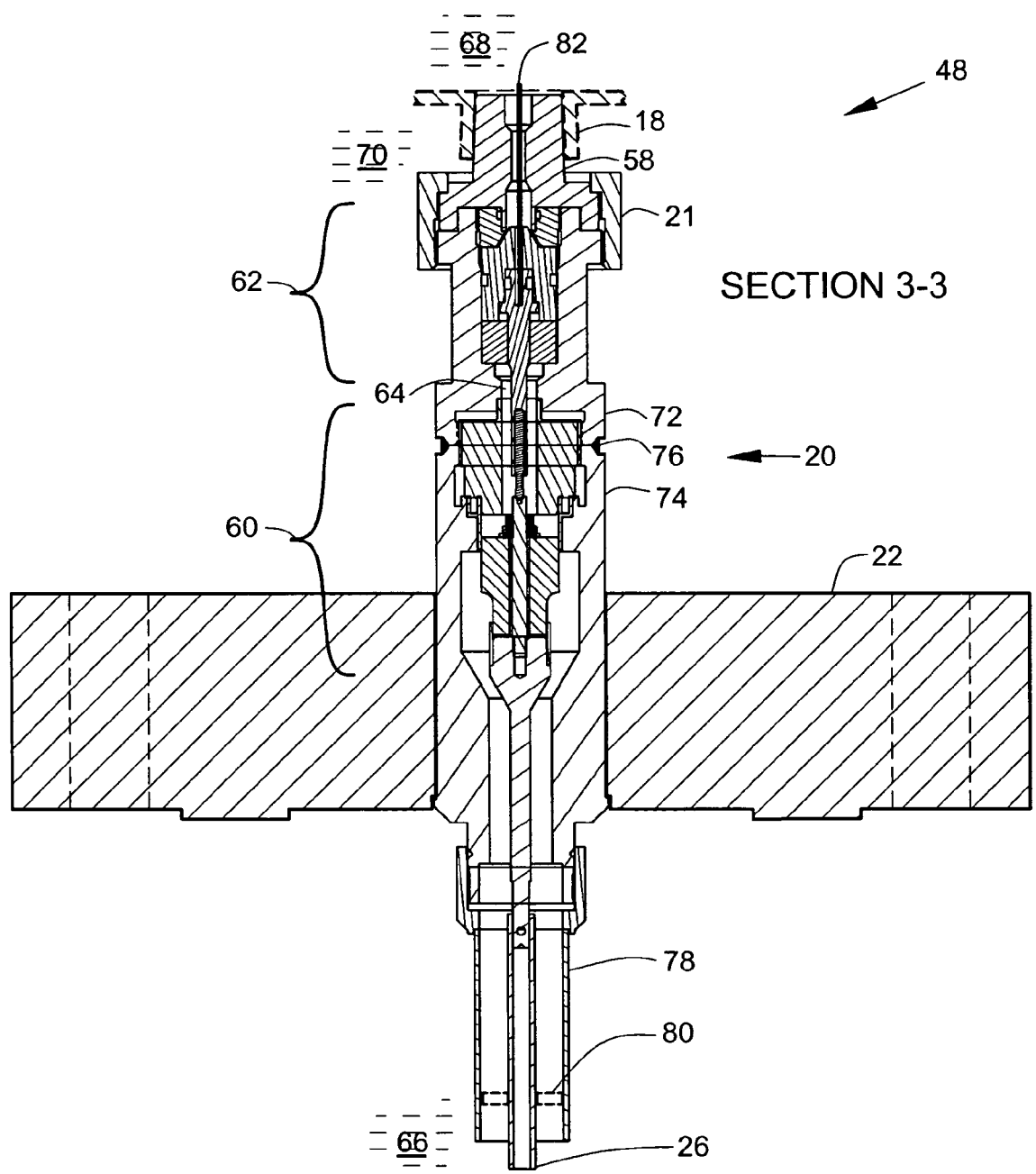

FIG. 3 illustrates a cross-sectional view of the internal construction of assembly 48 taken generally along cross-section line 3-3 in FIG. 2. As illustrated, the assembly 48 includes an impedance matched hermetic seal assembly 60, described in more detail below in connection with FIG. 4, and an impedance matched seal assembly 62, described in more detail below in connection with FIG. 6.

The seal assembly 60 provides a primary seal disposed within the adapter body 20. The primary seal assembly 60 provides a hermetic seal between an internal cavity 64 of the adapter body 20 and an atmosphere 66 in the tank 12 (FIG. 1). The seal assembly 62 provides a secondary seal disposed within the adapter body 20. The secondary seal assembly 62 provides a hermetic seal between the internal cavity 64 and an interior space 68 in the transmitter housing 18. As explained in more detail below in connection with FIG. 6, the seal assembly 60 also includes features that vent the internal cavity 64 to an atmosphere 70 outside the tank 12 in the event of a leak of the primary seal assembly 60.

The adapter body 20 comprises an upper adapter body 72 and a lower adapter body 74. The upper adapter body 72 is attached to the lower adapter body 74 by a threaded coupling to prove a secure mechanical connection as described in more detail below in connection with FIG. 4. The upper adapter body 72 is sealed to the lower adapter body 74 by a continuous circumferential weld 76 to provides a seal that is protected from mechanical separation by the threaded coupling.

An optional protective sheath 78 surrounds the antenna 26 (FIG. 1). Optional antennas supports 80 can also be provided to reduce movement of the antenna 26. A spring loaded pin 82 serves as a center coaxial conductor for coupling transmitted and received microwaves out of and into the transmitter housing 18. Various features of the assembly 48 are described in more detail below in connection with enlarged illustrations in FIGS. 4-6.

Figure 4:
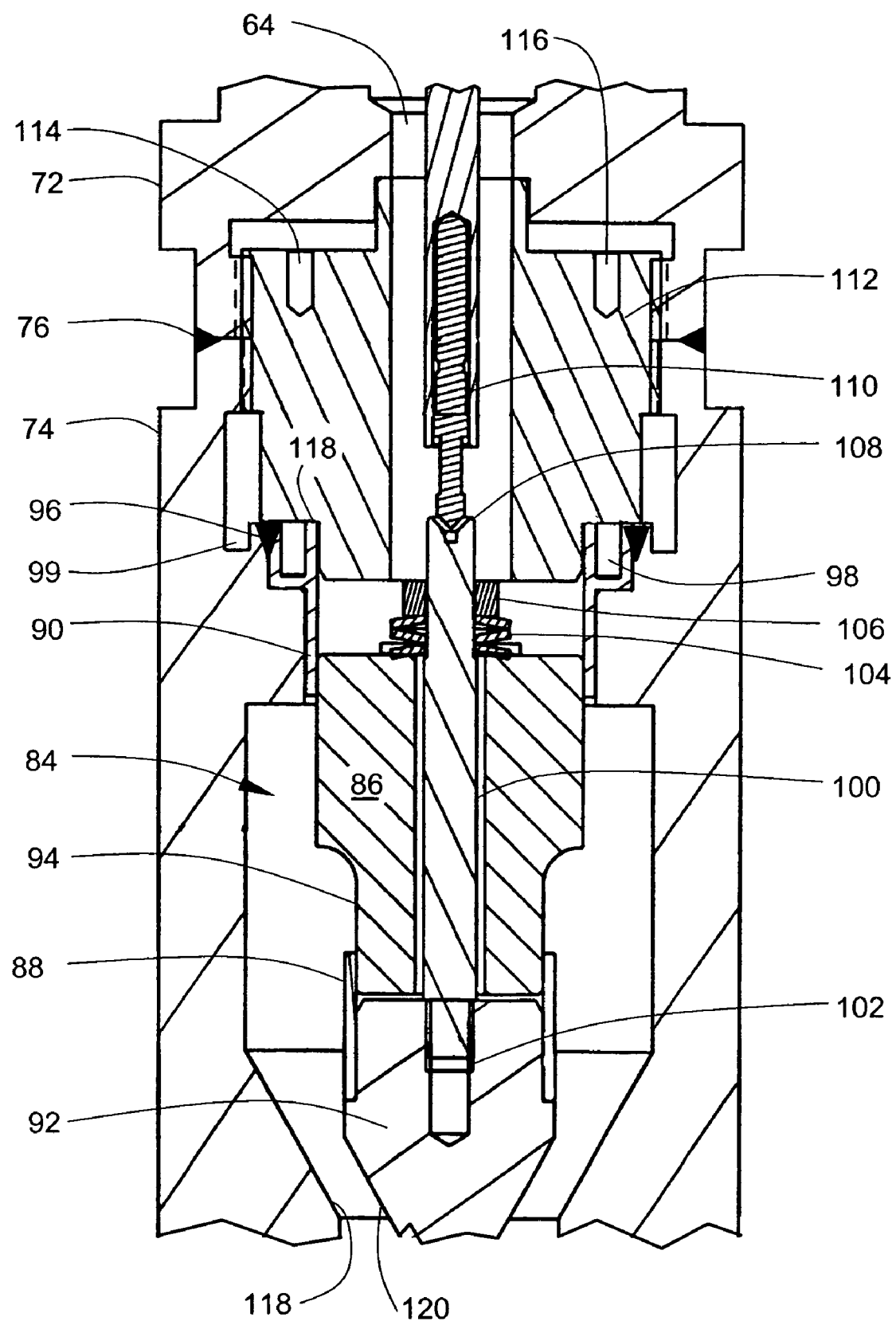

FIG. 4 is an enlarged illustration of a portion of the assembly 48 that includes the primary seal assembly 60.

The primary seal assembly 60 comprises a primary seal subassembly 84. The primary seal subassembly 84 comprises an electrically insulating annular ceramic seal body 86, an annular lower support band 88, and an annular upper support band 90 and a conductive rod 92. The ceramic seal body 86 has an outer surface 94 that is brazed to the upper and lower support bands 88, 90 to form hermetic seals and to transfer the mechanical load of suspending the antenna 26 (FIG. 1). The mechanical load is mainly transferred along the outer surface 94 which tends to reduce breakage of the ceramic seal body 86.

The completed primary seal subassembly 84 is placed in the lower adapter body 74, and then a continuous annular weld 96 is provided between the lower adapter body 74 and the upper support band 90 in order to seal the primary seal subassembly 84 to the lower adapter body 74. An annular stress relief groove 98 prevents the heating from weld 96 from distorting the main body of the upper support band 90. An additional stress relief groove 99 also relieves stress from the weld 96. The stress relief groove 98 also reduces axial forces on the weld 96.

A threaded conductive metal rod 100 passes through a clearance hole in the ceramic seal body 86 and is threaded into a blind threaded hole 102 in the conductive rod 92. One or more compression washers ("belleville washers") 104 are stacked on top of the ceramic seal body 86. A nut 106 is threaded onto the metal rod 100 and tightened to partially compress the compression washers 104. The force provided by compressed compression washers 104 provides axial compression to the ceramic seal body 86 that is relatively constant as the parts expand and contract with temperature changes. The axial compression force at least partially relieves the axial tension due to the suspension of the antenna weight, reducing net axial tension in the ceramic to reduce breakage. A top surface 108 of the metal rod 100 is shaped to contact a spring loaded pin ("pogo pin") 110 which is part of the secondary seal assembly 62. The metal rod 100 serves both as a center microwave conductor and as a means for axially compressing the ceramic seal body 86.

By constructing the primary seal subassembly 84 such that the hermeticity of the primary seal subassembly 84 is completed along its outside surfaces, and by directing stresses away from the microwave conductor (metal rod) 100, the subassembly 84 may be readily scaled to fit various sized applications, without having to analyze stresses on the microwave conductor 100 and other parts of the geometry of the structure. More specifically, the support bands can be stainless steel brazed with a gold/nickel braze, providing a radial compressive load on the ceramic seal body 86. In general, the subassembly 84 can be scaled up or down in size for differing applications without requiring analysis and adjustment of the shape for each new application. A variety of mounting arrangements can be accommodated by scaling the size, without having to change the geometric shape of the primary seal structure.

The ceramic seal body 86 is centrally recessed into and surrounded by the lower adapter body 74. The thermal mass of the surrounding lower adapter body tends to limit the rate of temperature change of the ceramic seal body 74 to gradual temperature changes. The possibility of thermal stress cracking of the ceramic seal body 86 is thus reduced.

An externally threaded metal coupler 112 is screwed into the lower adapter body 74. A tool (such as a pin spanner wrench, not illustrated) is inserted in blind holes 114, 116 and used to tighten the metal coupler 112 until it seats on an inner rim 118 of the upper support band 90. Any net upward force due to tank pressurization on the primary seal subassembly 84 is transferred to the inner rim 118, thus protecting the weld 96 from flexing.

The upper adapter body 72 is threaded onto the threaded metal coupler 112 and tightened until it seats on the lower adapter body 74. After tightening, the continuous circular weld joint 76 is applied to seal the upper adapter body 72 to the lower adapter body 74. The weld joint 76 provides a seal, however forces on the adapter bodies 72, 74 are carried by the threaded metal coupler 112 to reduce stress on the weld 76.

The cavity 64, which is filled with a dielectric gas such as air or nitrogen, extends downwardly through a central bore in the metal coupler 112 and through a central bore in the ceramic seal body 86. The cavity is sealed by the brazed joint at the lower support band 88, is sealed by the brazed joint at the upper support band 90, and is sealed by the circular welds 96, 76.

The conductive rod 92 supports the antenna 26 (FIG. 1) which hangs from the conductive rod 92. The conductive rod 92 is illustrated more detail in FIG. 5. The conductive rod 92 and the lower adapter body 74 include facing frustoconical tapered portions 118, 120 that provide a low reflection transition from the larger diameter lower support band 88 to a smaller outer diameter (FIG. 5) of the conductive rod 92.

Figure 5:
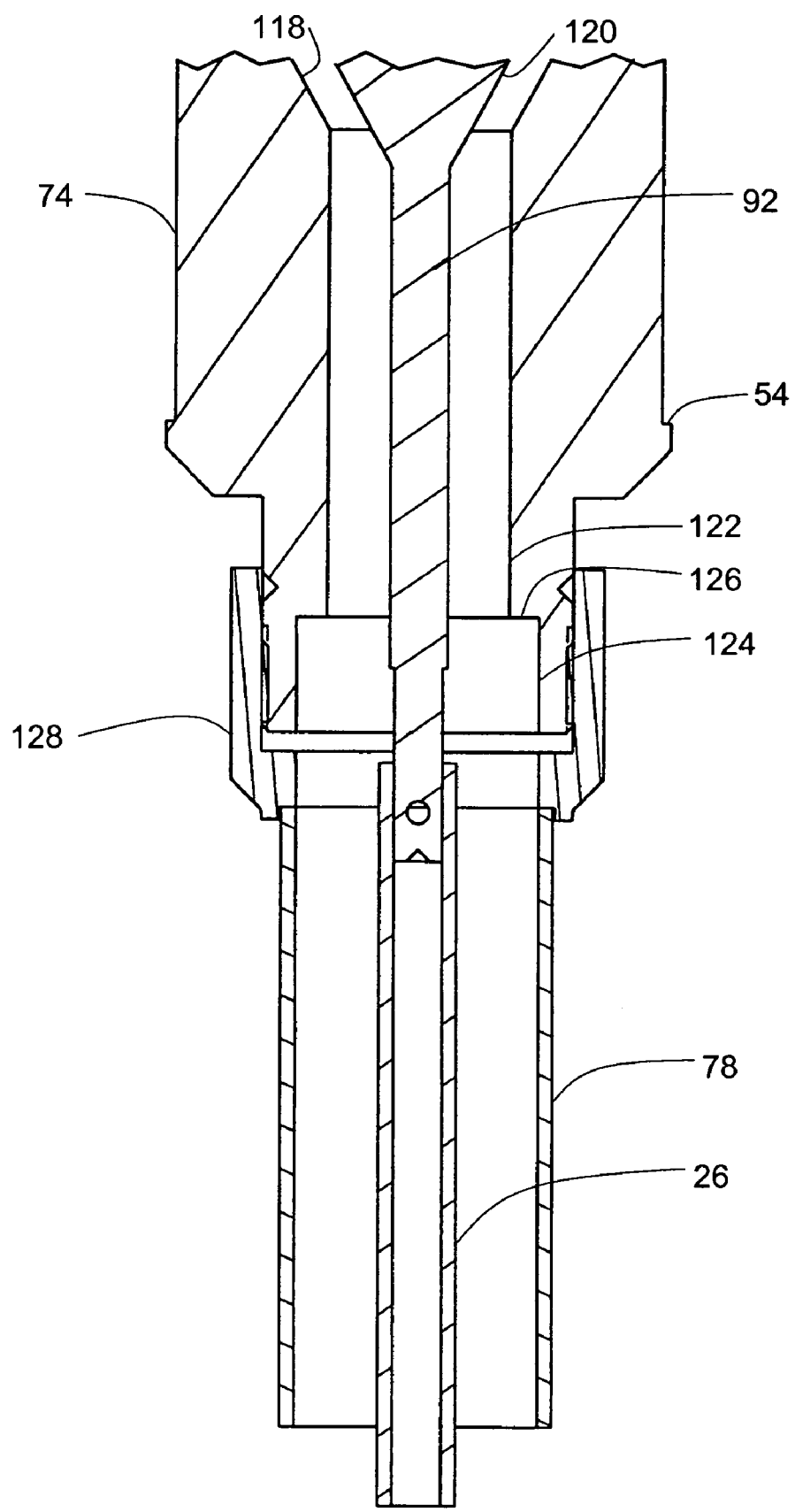

FIG. 5 illustrates an enlarged view of a lower end of the assembly 48. A smaller inside diameter 122 of the lower adapter body 74 abruptly transitions at 126 to a larger inside diameter 124 in order to provide a transmission line impedance discontinuity for the transmitted microwave pulse. This discontinuity is concentric with the smaller diameter of the conductive rod 92. The discontinuity causes a test or marker pulse to be reflected back to the transmitter. The marker pulse provides a positive indication that the conductive rod is present and that the ceramic seal body 86 (FIG. 4) has not cracked. The antenna 26 is attached to the conductive rod 92 by a pin or other attachment method. The sheath 78 is welded or threaded into an internally threaded nut 128. The nut 128 is threaded on a threaded lower end of the lower adapter body 74. In a preferred arrangement, one or more setscrews are used to prevent rotation of the nut 102 on the lower adapter body 74.

Figure 6:
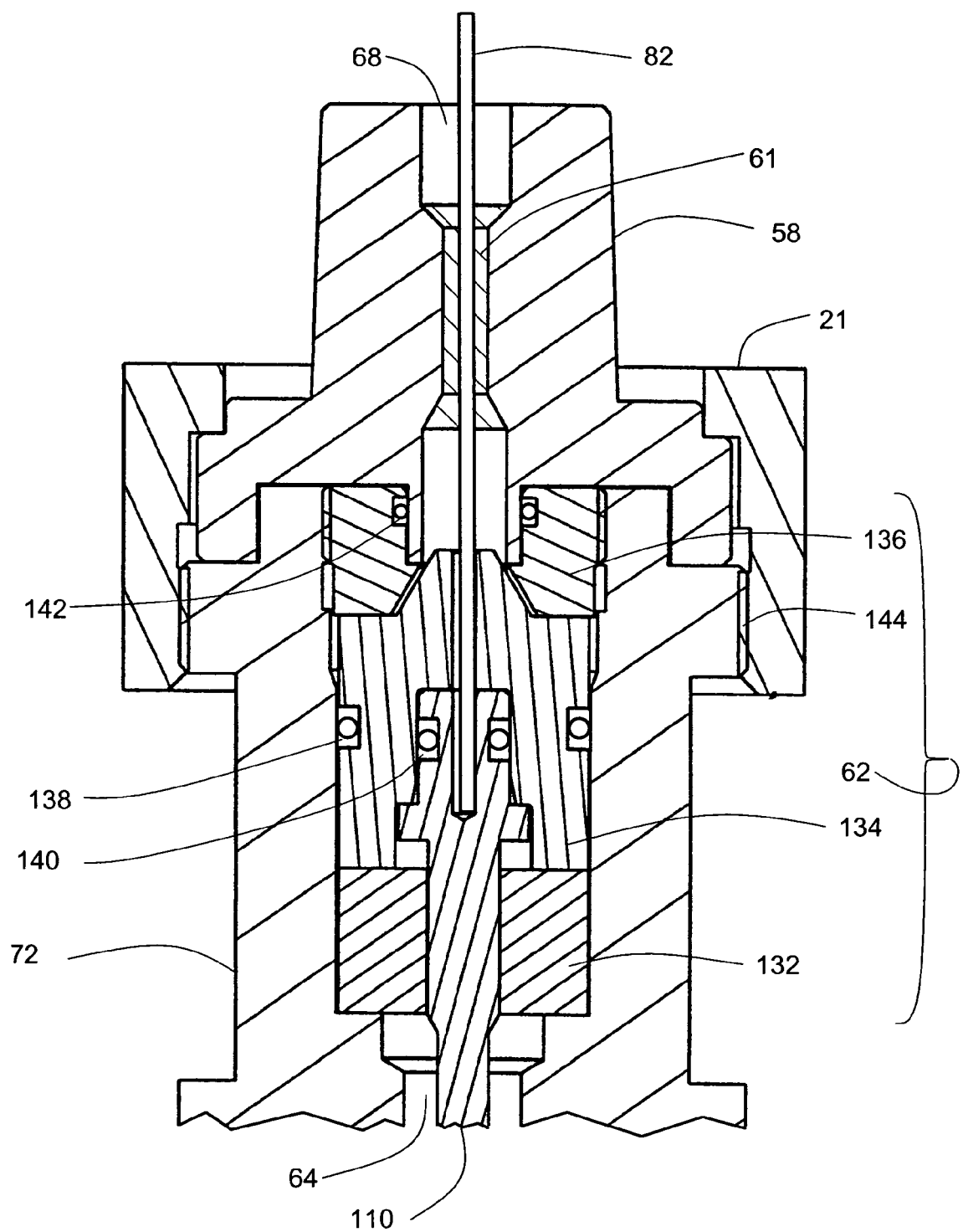

FIG. 6 illustrates an upper portion of the assembly 48 which includes the auxiliary (pressure relief) seal assembly 62. A secondary seal 61 seals the cavity 64 from an interior space in the transmitter housing 18. In the event of a leak of the primary seal assembly which pressurizes the cavity 64 with tank atmosphere, the auxiliary seal assembly 62 vents tank atmosphere through threaded coupler nut 21 to the surrounding atmosphere. The tank atmosphere can be vented through threads 144 or through a vent hole (not illustrated) in the coupler nut 21.

In the auxiliary seal assembly 62, The spring loaded pin 110 is assembled with an O-ring 140 and inserted into a generally cylindrical plug 134. A second generally cylindrical plug 132 is also assembled over the spring loaded pin. An O-ring 138 is placed in a groove on an outer surface of the plug 134. The assembly of plugs 132, 134, O-rings 138, 140 and pin 110 are inserted into a top opening on the upper adapter body 72. The O-ring 138 is sized to be only lightly compressed so that it will vent pressurized gasses from cavity 64 under fault conditions (as explained in more detail below in connection with FIGS. 7B-7C).

A generally cylindrical plug 136 is provided with an O-ring 142 and slid over a protruding central lower portion of the housing adapter 58. An assembly of the plug 136, O-ring 42 and housing adapter 58 is inserted into the top opening of the upper adapter body 72. The coupler nut 21 is threaded on to threads on the upper adapter body and tightened to compress the plugs 136, 134, 132.

The spring loaded pins 82, 110, the metal rod 100, and the conductive rod 92 (FIGS. 4,5) serve as central microwave conductors extending between the transmitter and the antenna. The upper and lower adapter bodies 72, 74, the upper support band 90, and the threaded adapter 112 serve as outer microwave conductors that are coaxial to the central microwave conductors. Insulating plugs 132, 134, 136, ceramic seal body 86 and cavity 64 provide annular insulating spaces separating the central microwave conductors from the outer microwave conductors. The arrangement of the microwave conductors and the annular insulating spaces forms a coaxial waveguide for communicating microwaves between the transmitter and the antenna. Diameters of the waveguide components are set to generally reduce discontinuities along the waveguide, however, a single discontinuity 126 is included for test purposes.

In preferred embodiments, the upper and lower adapter bodies comprise duplex ferritic-austenitic alloys for corrosion resistance. In preferred embodiments, the insulating plugs 132, 134, 136 comprise teflon or PTFE. In a preferred embodiment, the conductive rod 92 comprises 316 stainless steel for corrosion resistance and high temperature performance. In preferred embodiments, the seal body 86 comprises sintered alumina ceramic to provide corrosion resistance and tensile strength. In a preferred embodiment, the braze joints between the seal body 86 and upper and lower stainless steel support bands 88, 90 comprise a gold/nickel brazing alloy.

Variations on the embodiment shown in FIGS. 1-6 are described below in connection with other embodiments shown in FIGS. 7-11. Reference numbers used in FIGS. 7-11 that are the same as reference numbers used in FIGS. 1-6 identify similar or comparable features.

Figure 7A:
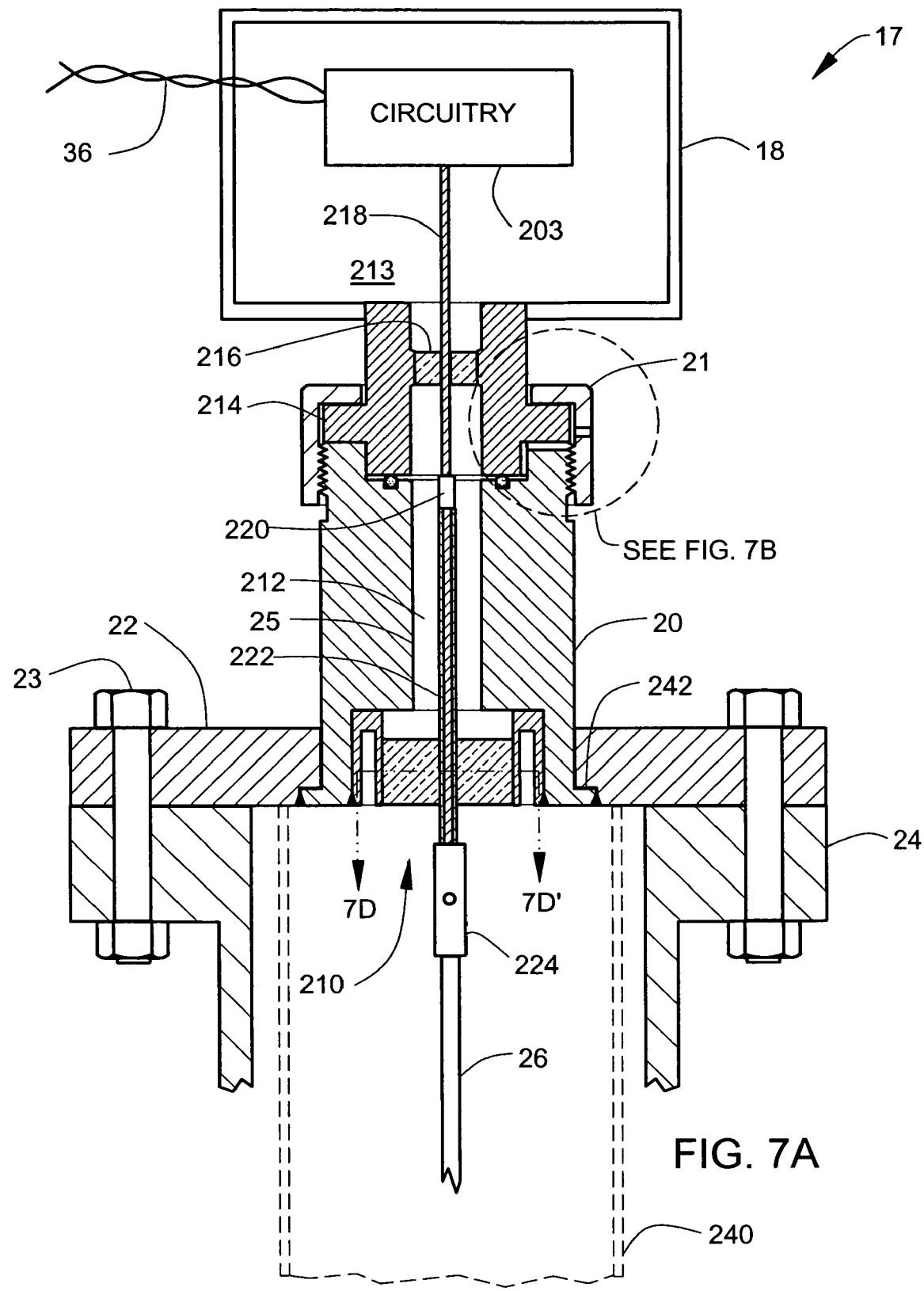
FIGS. 7A, 7B, 7C, 7D, 7E illustrate details of a second embodiment of a microwave level gauge.

FIG. 7A illustrates an enlarged cross-sectional view of a microwave level gauge assembly 17 similar to the embodiment shown in FIG. 1. Assembly 16 includes transmitter housing 18 (shown partially in cross section and partially in outline) coupled to the adapter body 20 by the threaded coupler nut 21. The adapter body 20 is coupled to tank port flange 24 via flange 22 and bolts 23. A primary seal assembly 210 is positioned over tank port flange 24 to provide hermetic pressure isolation from the tank atmosphere. The primary seal assembly 210 provides an hermetic seal between an internal cavity 212 in the adapter body 20 and the tank atmosphere. An internal cavity 213 in the transmitter housing 18 is further sealed from the internal cavity 212 by a secondary seal 216. The transmitter housing 18 is isolated from the process material, heat, pressure and atmosphere within the tank 12. The primary seal assembly 210 is described in more detail below in connection with FIG. 7D.

In some embodiments, the adapter body 20 may be provided with a protruding lip 242 sized to mate with a corresponding recess in the flange 22. The protruding lip 242 facilitates alignment of the adapter body 20 to the flange 22 during welding, and also improves the pressure rating of the welded joint.

The adapter body 20 defines an outer wall 25 of the internal cavity 212 that extends from the primary seal assembly 210 to a housing adapter 214 (which is part of housing 18). The internal cavity 212 also extends to the secondary seal 216 in the housing adapter 214. A central microwave conductor 218 extends from circuitry 203 in the cavity 213, through the secondary seal 216, and into the cavity 212. A connector 220 couples the microwave conductor 218 to a primary conductor 222, which extends through the primary seal assembly 210 and into the tank. The connector 220 provides electrical contact between the microwave conductor 218 and the primary conductor 222 over a range of motion as the housing adapter 214 is slid into position at a top end of the adapter body 20. This range of motion can be accommodated in connector 220 by a sliding pin and socket arrangement, or a movable, spring loaded contact pin commonly referred to as a pogo pin contact. Other types of attachment mechanisms with a suitable range of mechanical motion may also be used. In general, the connector 220 may be any type of electrical connection mechanism for connecting two conducting elements, provided that the attachment mechanism does not have a shape that causes an impedance mismatch resulting in microwave reflection, and provided that the connector 220 has a range of mechanical engagement sufficient to allow for mechanical component tolerances in mating the microwave conductor 218 and the primary conductor 222. Finally, an antenna adapter 224 couples the primary conductor 222 to a microwave antenna 26 within the tank.

In general, the housing adapter 214 has a temperature coefficient of expansion that is higher than a temperature coefficient of expansion of the secondary seal 216. The conductor 218 has a lower temperature coefficient of expansion than the temperature coefficient of expansion of the secondary seal 216. The surface of the conductor 218 can be grooved or roughened where it passes through the glass secondary seal 216 to improve sealing to the glass. During the assembly process, the secondary seal 216 is formed in place in the housing adapter 214. In a preferred embodiment, the secondary seal 216 is a glass-to-metal seal of the type used in making sealed electrical feedthroughs from silica glass. The glass formulation is adjusted such that the glass has a lower coefficient of expansion than the housing adapter 214 and thus, as it cools after forming, is always under a compressive load. Thus, a high compressive load secures the conductor 218 and the secondary seal 216 in place within the housing adapter 214.

The secondary seal 216 is sealed to the housing adapter 214. The housing adapter 214 is sized to mate with the adapter body 20 and adapted to releasably fasten to the adapter body 20 using the threaded coupler nut 21. The arrangement of the housing adapter 214, the threaded coupler nut 21 and the adapter body 20 are described in more detail below in connection with FIG. 7B.

Figure 7B:
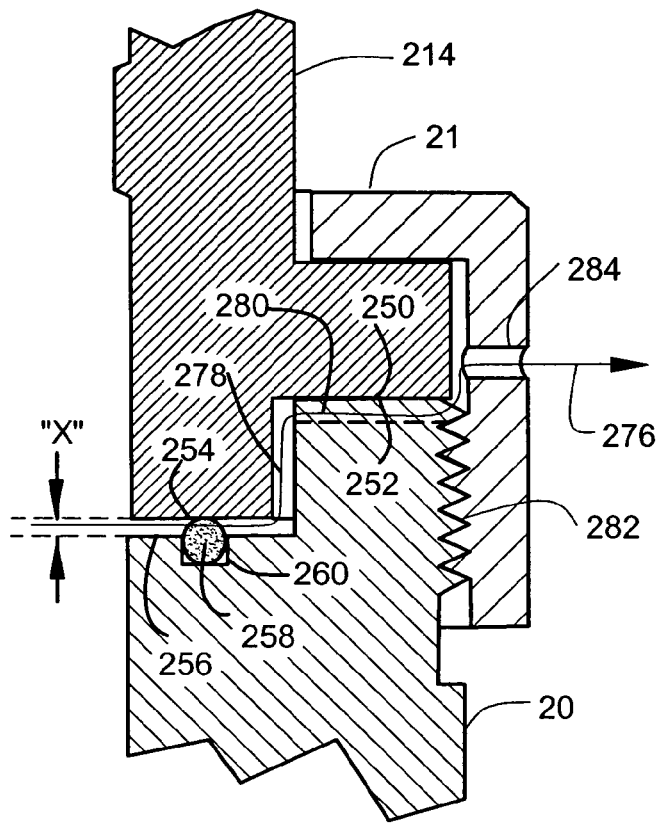

FIG. 7B illustrates an enlarged sectional view of a region (indicated in FIG. 7A by a circle) where the housing adapter 214, the threaded coupler nut 21 and the adapter body 20 come together and contact one another. The threaded coupler nut 21 is twisted to press together and mate a lower face 250 of the housing adapter 214 against an upper face 252 of the adapter body 20. The mating of the faces 250, 252 provides a positive stop that accurately positions an O-ring sealing face 254 to be spaced apart by a distance "X" from a grooved O-ring mounting face 256 of the adapter body 20. An O-ring 258 positioned in a groove 260 is lightly compressed between the faces 254, 256 to form a low pressure seal. The threaded coupler nut 21 also provides a fastener means for releasably fastening the housing adapter 214 to the adapter body 20, providing a mechanical separation joint between the primary seal assembly 210 and the secondary seal 216 for transmitter maintenance, without having to remove the entire assembly 16. The housing adapter 214 and the adapter body 20 mate with one another along surfaces that are generally circular or cylindrical so that the housing 18 can be mounted on the adapter body 20 in different rotational positions to meet the needs of a particular installation arrangement.

Figure 7D:
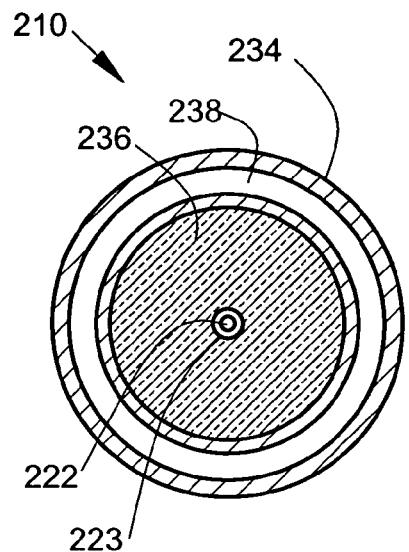
Figure 7C:
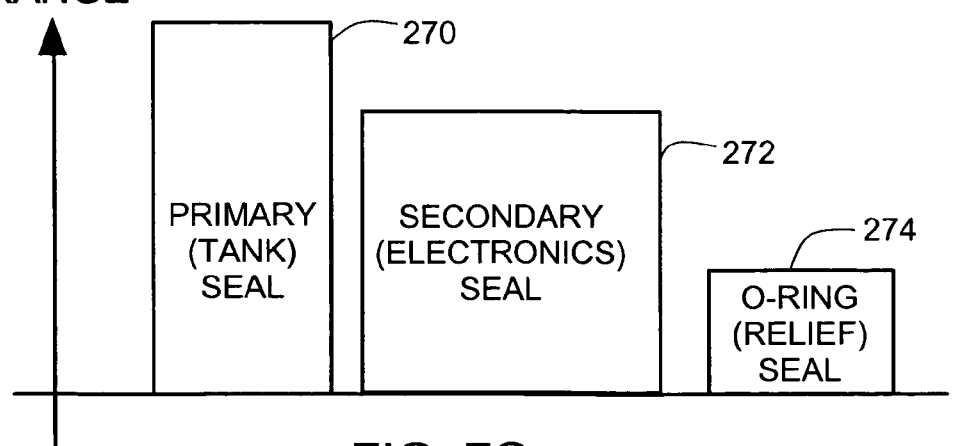

As illustrated in FIG. 7C, the O-ring 258 (or alternatively a gasket) provides a low-pressure environmental seal as well as an annunciating mechanism (vent to atmosphere) in the event of a failure of the primary seal assembly 210. The primary seal assembly 210 and the secondary seal 216 have relatively high pressure sealing ranges 270, 272 illustrated in FIG. 7C in comparison with the relatively low pressure sealing range 274 illustrated in FIG. 7C of the O-ring seal 258. When the tank 12 (FIG. 1) is highly pressurized and the primary seal assembly 210 fails and leaks, then the internal cavity 212 becomes pressurized as well and the pressurized gas in the tank 12 leaks out past the O-ring seal as indicated by arrow 276 in FIG. 7B.

The housing adapter 214 and the adapter body 20 are provided with one or more radially spaced grooves 278, 280 to allow pressurized gas to leak out. The leaking gas can leak out through spaces 282 around threads of the threaded coupler nut 21. Alternatively, leaking gas can vent through an optional radial bore 284 in the threaded coupler nut 21. The leaking gas provides an audible or aromatic annunciation of a broken primary seal assembly 210. The loss of gas from the tank 12 can also be annunciated by tank pressure sensing instruments (not illustrated) sensing loss of tank pressure. The pressure relief provided by the lightly compressed O-ring seal 258 prevents an increase in pressure in internal cavity 212 that could otherwise break the secondary seal 216 and allow gas from the tank to flow through the cavity 213 into electrical wiring conduits that carry leads 36 (FIG. 1) and cause damage to control system 34 (FIG. 1).

An enlarged view of the primary seal assembly 210 is illustrated in FIG. 7D. The primary seal assembly 210 is in direct contact with the atmosphere in the tank 12 (FIG. 1). The primary seal assembly 210 generally includes a stainless steel body 234 into which a ceramic seal 236 is brazed. The braze material is preferably a gold-nickel alloy with a melting point typically around 1740 degrees F. The braze material can be applied using known braze material application methods such as braze pastes and braze preforms.

The primary conductor 222 is disposed within a an outer jacket 223. Due to significant differences in thermal expansion coefficients, it is difficult to join a solid 316 stainless steel conductor directly into a seal such as seal 236. However, it is necessary to attach and hermetically seal a conductor in the seal 236. As used herein, the term "hermetic" refers to a device which is sealed against entrance of atmospheric contaminants (such as moisture, dust, and the like) or process contaminants (such as process fluids, corrosive or abrasive process materials, and the like). For example, in one preferred embodiment, the seal has a hermeticity or leak rate equal to or less than approximately $1 \times 10^{-7}$ standard cubic centimeters of helium per second. In another preferred embodiment, such as for use with lower pressure or less corrosive process materials, the leak rate may be higher than $1 \times 10^{-7}$ std cc He/sec, but still less than that of a conventional PTFE or graphite process seal.

The microwave feedthrough (primary conductor 222 and outer jacket 223) through the primary seal assembly 210 must both efficiently conduct microwave signals and safely and reliably seal corrosive atmospheres at high pressures and temperatures. The feedthrough comprises multiple concentric layers of materials with differing coefficients of expansion and differing corrosion resistance properties so as to provide an improved thermal match between the seal 236 and the feedthrough while providing an outer layer 223 that is corrosion resistant and that brazes well to the material of the seal 236.

In FIG. 7D, the primary conductor 222 is formed from a low-expansion alloy (such as Kovar® or Alloy 52) within a thin-walled type 316 Stainless Steel tube 223. Thus, the primary conductor 222 and the tube 223 form a composite feed-through that provides an improved thermal expansion match with the seal 236 without compromising corrosion resistance or mechanical strength. The composite conductor 222, 223 is brazed to the ceramic seal 236, thereby establishing a hermetic seal that effectively isolates circuitry 203 (FIG. 7A) in the housing 18 from the process material within the tank 12 (FIG. 1).

By brazing the ceramic seal 236 to the stainless steel body 234, the primary seal assembly 210 can operate effectively at elevated temperatures and pressures without compromising corrosion resistance. However, the difference in thermal coefficients of expansion among the various materials would cause stress fractures at the braze and weld joints if such stresses are not relieved by the groove 238.

The stress isolation groove 238 is disposed in the stainless steel body 234 to absorb stresses caused by the brazing process or from other sources. For example, as the primary seal assembly 210 cools, the stress isolation groove 238 absorbs stresses caused by uneven cooling of the primary seal assembly 210 (the ceramic seal 236 and the stainless steel body 234) after the brazing process.

In a preferred embodiment, the ceramic seal 236 is made from sintered alumina ceramic, which is generally a hard, wear-resistant ceramic. Additionally, in a preferred embodiment, the secondary seal 216 is a glass-to-metal seal arrangement. The secondary seal 216 functions as a secondary process barrier, an environmental barrier and as a barrier to flame propagation in a flamepath. Since the secondary seal 216 is not normally in contact with the process, the design may use economical glass-to-metal design techniques and materials, though a ceramic-metal seal design can also be used.

The primary seal assembly 210 and the secondary seal 216 are preferably impedance matched so spurious reflections of the microwave signal are reduced. If the primary and secondary seals are not impedance matched, the mismatched impedances can cause a reflected transmission wave, which can effect the accuracy of the level gauge. The impedance matching process comprises adjusting the diameter of coaxial center conductors 218, 222, while taking into account the dielectric constant of air or seal materials surrounding the conductors 218, 222. A relatively constant characteristic line impedance $Z_0$ is maintained as the microwaves pass through the adapter body 20 to avoid spurious reflections.

In some embodiments, it may be desirable to provide a protective sheath 240 (FIG. 7A) or coaxial tube (which is another antenna design) to protect the microwave antenna 26. In particular, the microwave antenna 26 may extend 10 or more meters and may be relatively thin, such that movement of the process material within a tank can cause the antenna 26 to break (particularly near the adapter 224 or along the primary composite conductor 222). The sheath 240 protects the antenna from bending moments caused by movement of the process material.

Figure 7E:
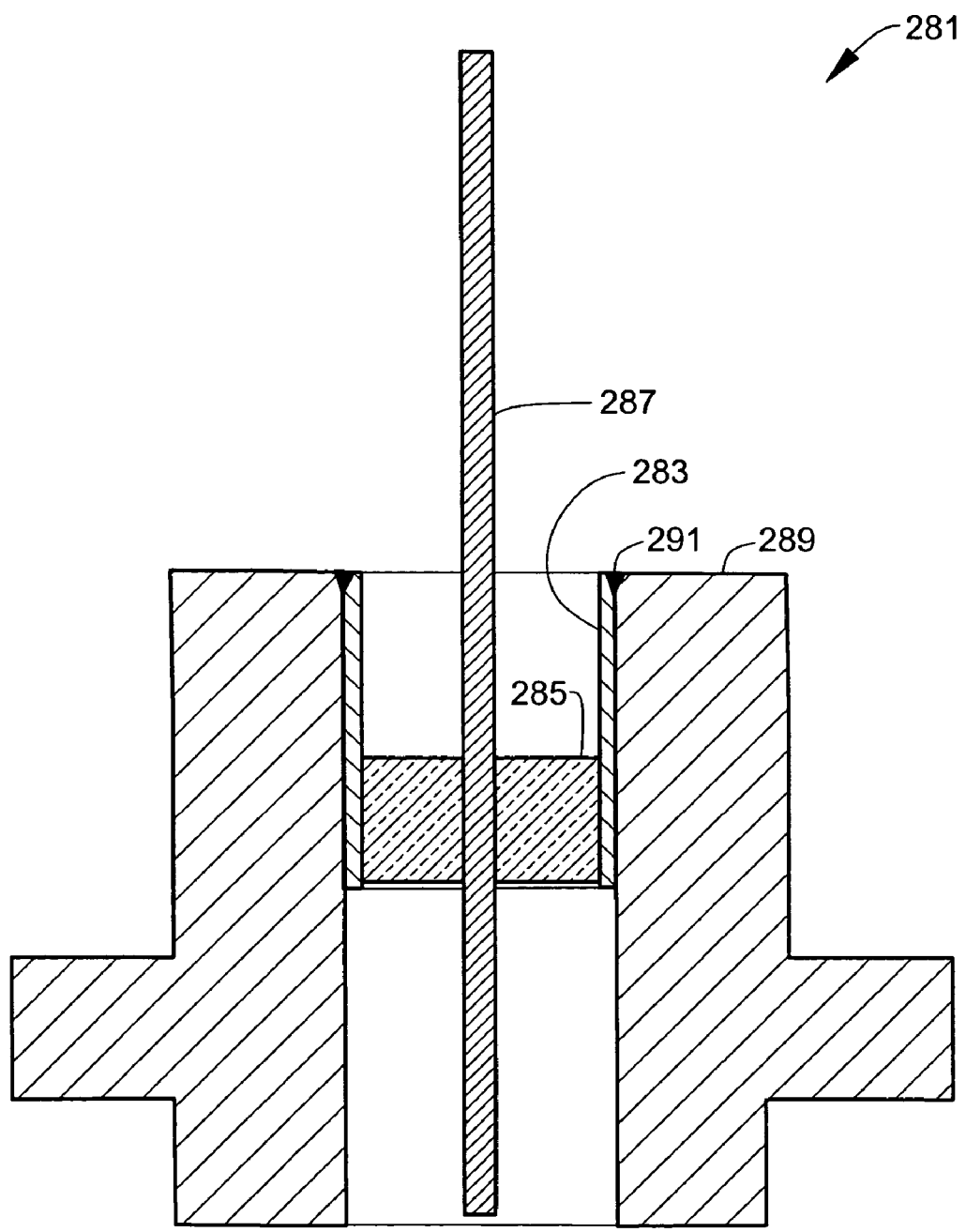

FIG. 7E illustrates an embodiment of a secondary seal assembly 281 that can be used as an alternate to the seal 216 illustrated in FIG. 7A. The secondary seal assembly 281 comprises a metal tube 283 into which a glass seal 285 is formed in place. The glass seal 285 is also sealed to a central microwave conductor 287. The metal tube 283, glass seal 285 and the central microwave conductor 287 can be conveniently manufactured as a separate assembly. The metal tube 283 is inserted into a housing adapter 289, and welded at circular weld 291. The arrangement shown in FIG. 7E allows for the housing adapter 289 to be formed of a metal that is not compatible with forming a glass-to-metal seal. The metal tube 283 can be formed of a material that is compatible with forming a glass-to-metal seal with the seal 285.

Figure 8:
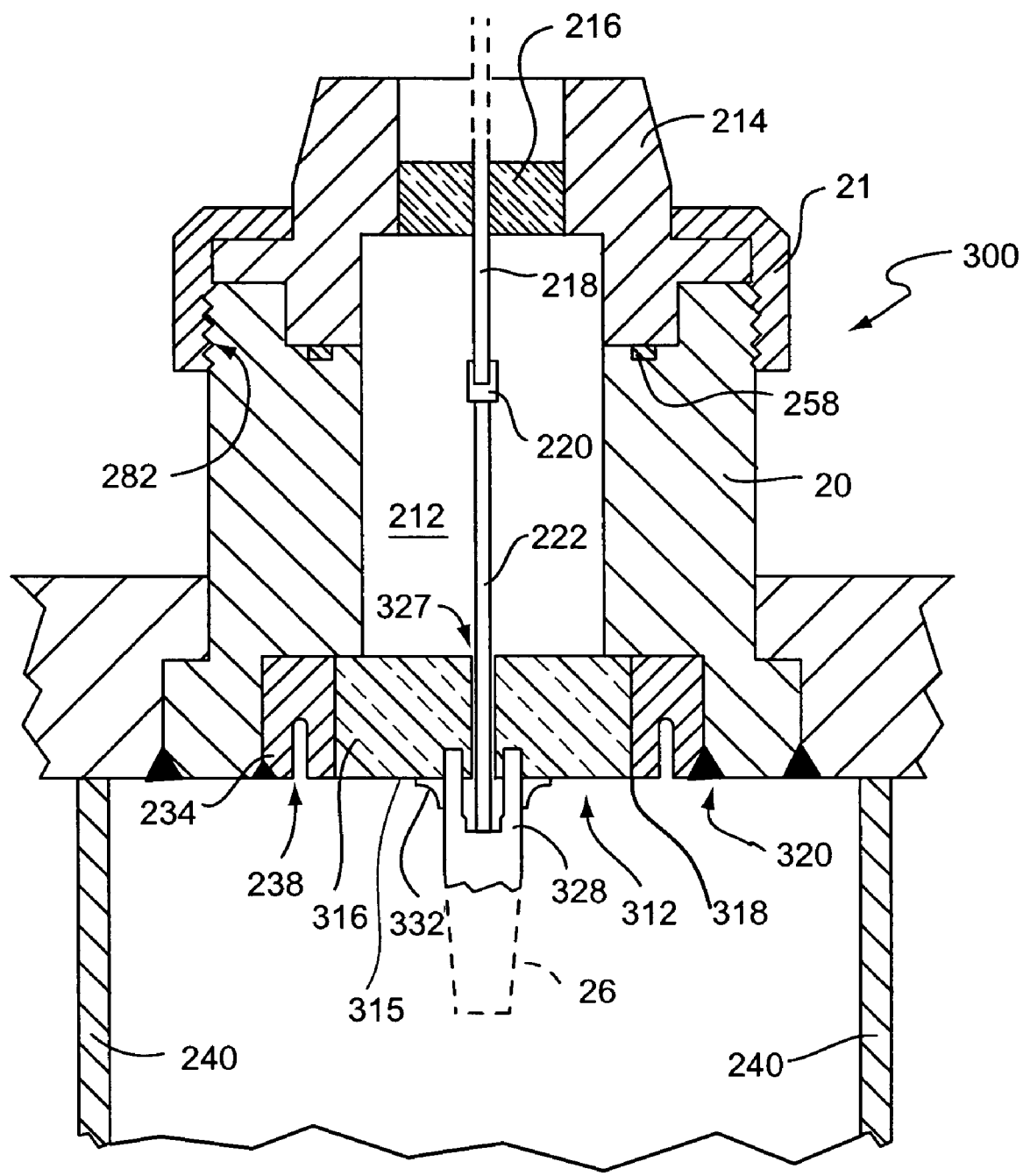
FIG. 8 is a cross-sectional view of a microwave level gauge mounting assembly.

FIG. 8 is an enlarged cross-sectional view of a microwave level gauge mounting assembly 300 in which braze joints are made on a lower surface 315 of a primary ceramic seal 316. Reference numbers used in FIG. 8 that are the same as reference number used in FIGS. 7A, 7B, 7D refer to the same or similar features as those discussed in connection with FIGS. 7A, 7B, 7D and, for sake of brevity, are not further discussed in connection with FIG. 8.

In assembly 300, brazed joints complete a hermetic seal and carry the weight or mechanical load of the antenna on the outside lower surface 315. There is thus no need for a hermetic or load bearing joint between a primary conductor 222 and the ceramic seal 316. There is also no need for corrosion resistance in the primary conductor 222. The primary conductor 222 passes through a clearance hole 327 in the ceramic seal 316. In other respects, mounting assembly 300 is similar to the mounting assembly illustrated in FIGS. 7A, 7B, 7D.

A primary seal assembly 312 isolates the internal cavity 212 from process fluid in a tank. The primary seal assembly 312 includes a stainless steel body 234 and a ceramic seal 316. The ceramic seal 316 is preferably attached to the stainless steel body 234 by a braze joint 318. A weld joint 320 preferably attaches the stainless steel body 234 to the adapter body 20. A stress isolation groove 238 is provided in the stainless steel body 234 to isolate heat induced stresses caused by the brazing process, so that uneven cooling and thermal coefficient differences do not cause the braze joint 318 and/or the weld joint 320 to fail.

The primary conductor 222 extends from the cavity 212 through the opening 327 provided in the primary seal 316. An isolating adapter 328 is positioned over the opening 327 and around the primary conductor 222. The isolating adapter 328 is attached to the primary seal 316 by a support band 332, which is brazed to both the primary seal 316 and to the isolating adapter 328. The support band is preferably formed of stainless steel. Antenna 26 is coupled to the isolating adapter 328 and extends into the process material in the tank.

In general, isolating adapter 328 and support band 332 maintain an hermetic seal over the primary conductor 324. Additionally, isolating adapter 328 and support band 332 serve to direct bending moments and other stresses from the antenna 330 away from the conductor 222. In particular, the isolating adapter 328 and support band 332 form a hermetic seal with the primary seal 316, and carry any loads on the outside surface away from the conductor 324.

In general, the isolating adapter 328 may be formed from corrosion and heat resistant material. In one embodiment, the isolating adapter 328 is formed from 316L stainless steel. In still another embodiment, the isolating adapter 328 is formed using Hastelloy® alloy, registered to Haynes International, Inc. of Kokomo, Ind. The isolating adapter 328 functions to mechanically and hydrostatically isolate the primary conductor 222 and the cavity 212 from the process material in the tank while still providing an electrical conduction path. Support band 332 provides a strong and durable attachment with a large annular surface area brazed to the isolating adapter 328 and a large flat surface area brazed to the seal 316. The resulting structure can operate effectively at high temperatures and pressures without compromising corrosion resistance.

Figure 9:
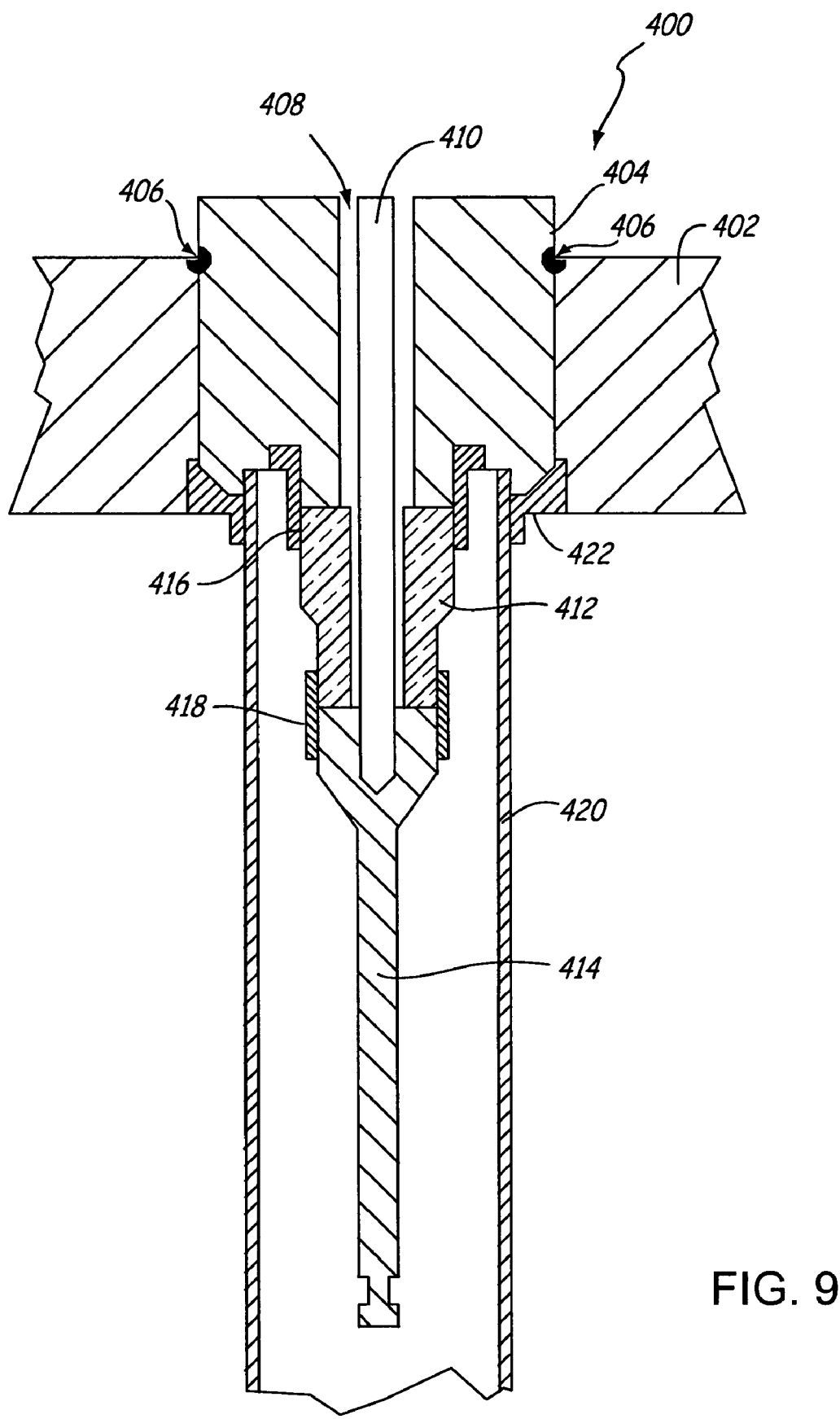
FIG. 9 is a cross-sectional view of an embodiment of a primary seal and antenna attachment.

FIG. 9 illustrates an expanded view of an embodiment of a primary seal design. Level gauge assembly 400 includes stainless steel body 402 (comparable to stainless steel body 234 in FIG. 8) and a cylindrical metal body 404. The cylindrical metal body 404 and the steel body 402 are attached at a weld joint 406. The cylindrical metal body 404 defines an air gap 408 sized to receive a conductor rod 410, which extends through the cylindrical metal body 404.

Within the tank, ceramic seal 412 extends over the air gap 408 and around the conductor rod 410. The ceramic seal 412 is attached to the cylindrical metal body 404 by an upper support band 416, which is brazed around an outer circumference of the ceramic seal 412 and attaches to the cylindrical metal body 404 by brazing or welding to complete the seal at the upper support band 416. Additionally, the ceramic seal 412 is sealed to conductive rod 414 by a lower support band 418 brazed around the outer circumference of the ceramic seal 412 and the conductive rod 414 to form a seal. In a preferred embodiment, a coaxial tube 420 (or protective sheath) is attached to the cylindrical metal body 404 via a support band 422, in order to protect the conductive rod 414. The coaxial tube 420 is preferably welded to the support band 422.

In one embodiment, the conductive rod 414 connects to an antenna that extends twelve meters into a fluid-filled tank. Fluidic motion transferred to the antenna can impose shear stresses and bending moments on the conductive rod 414. The coaxial tube 420 provides a layer of protection to reduce fluidic motion around the antenna to reduce bending moments on the conductive rod 414. More importantly, the ceramic seal 412, the conductive rod 414, and the support bands 416 and 418 isolate the conductor 410 from those external stresses. In addition to sealing the air gap 408 from the process material, the support bands 416, 418 transfer stresses along the outside surface of the ceramic seal 412 and to the cylindrical metal body 404. Thus, the stresses and bending moments are directed on the outside of the ceramic seal 412 and away from the conductor 410.

In the embodiment of FIG. 9, the ceramic seal 412 is sealed over the conductor rod 410 by a braze joint between the upper support band 416 and the ceramic seal 412 as well as by a weld joint between the upper support band 416 and the cylindrical metal body 404. The conductive rod 414 is sealed over the tip of the conductive rod 410 by a braze joint between the lower support band 418 and the ceramic seal 412 as well as by a weld joint between the lower support band 418 and the conductive rod 414. The braze joints and weld joints on the support bands 416 and 418, together with the ceramic seal 412 and the conductive rod 414 effectively maintain an hermetic seal, providing process isolation for the conductor 410 and the associated electronics.

In general, the braze material may be any material that is corrosion resistant and that is capable of bonding to metals and to ceramics. In a preferred embodiment, the brazed upper and lower support bands 416 and 418 are formed stainless steel and are brazed with a gold-nickel brazing alloy (82%/18%).

Additionally, the cylindrical metal body 404 may be formed from any type of corrosion and heat resistant material, including stainless steel, 316L stainless steel, Hastelloy®, duplex (ferritic-austenitic alloy) materials or any other material having similar properties.

Figure 10:
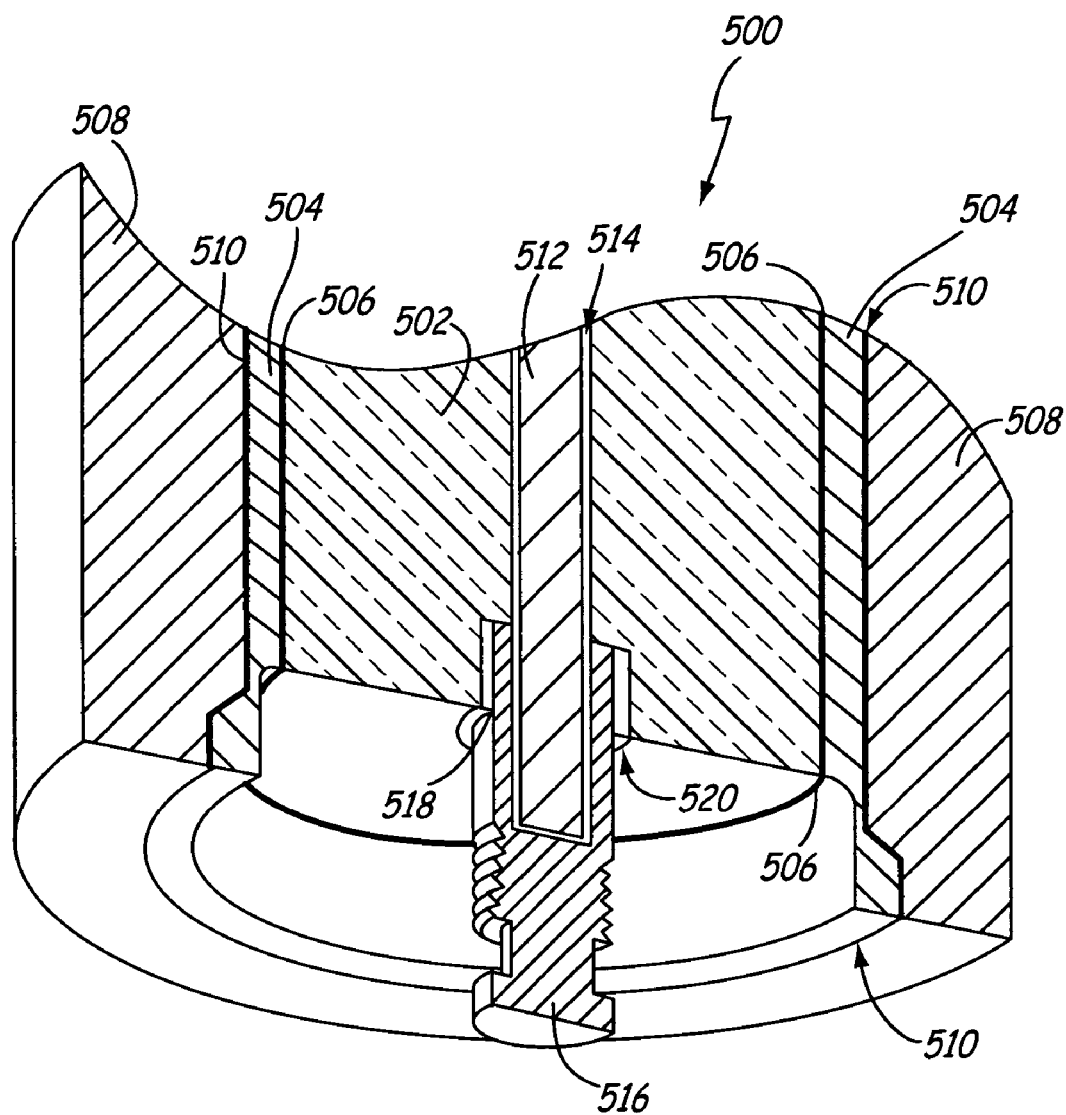
FIG. 10 is an expanded cross-sectional view of an embodiment of a primary seal and antenna attachment.

FIG. 10 illustrates an expanded view of a primary seal assembly 500 according to an embodiment of the present invention. The assembly 500 includes primary seal 502 and stainless steel body 504, which are coupled by braze joint 506. The stainless steel body 504 is, in turn, coupled to flange 508 by weld joint 510.

Conductor 512 extends through air gap 514 disposed in the primary seal 502. Antenna connector 516 seals off the air gap 514 and contacts the conductor 512. The antenna connector 516 is positioned partially within a recess 520 disposed in the wetted surface of the primary seal 502, and is coupled to the primary seal 502 via a braze joint 518 in the recess 520. As used herein, the term "wetted" or "wetted surface" refers to a surface that is exposed to the process material. The conductor 512 is electrically coupled to the antenna connector 516 to maintain a signal path for the microwave signal. An antenna (not shown) may be coupled to the antenna connector 516 and may extend into the process material within the tank.

The braze joint 518 couples and seals the antenna adapter 516 to the primary seal 502, completing the hermetic seal that isolates the conductor 512 from the process material. Additionally, the braze joint 518 assists in transferring bending moments and shear stresses away from the conductor 512 and into the seal 502 and associated structure, which is better equipped to dissipate the stresses without cracking.

Figure 11:
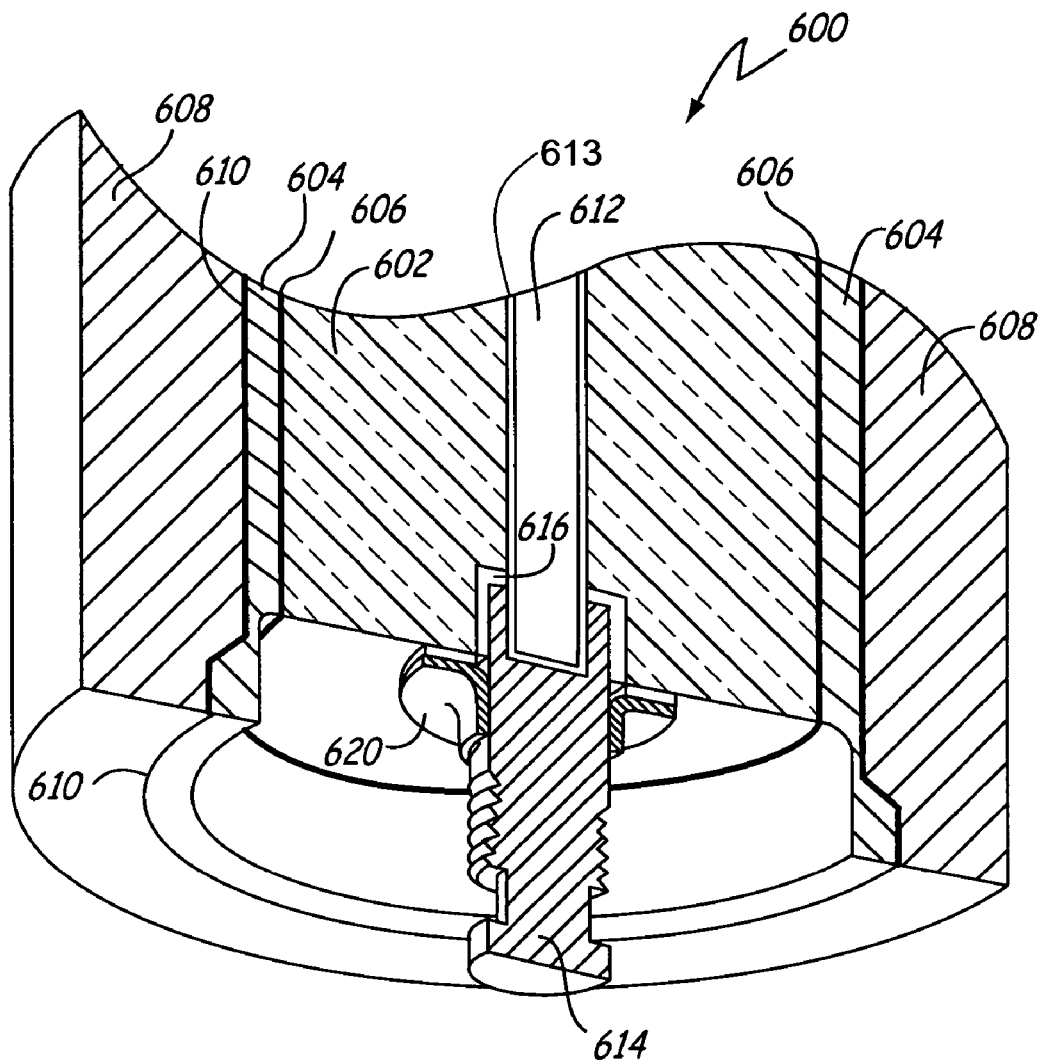
FIG. 11 is an expanded cross-sectional view of an embodiment of a primary seal and antenna attachment.

FIG. 11 illustrates an expanded view of another embodiment of the present invention. As shown, the assembly 600 includes primary ceramic seal 602 coupled to stainless steel body 604 by brazed joint 606. The stainless steel body 604 is also coupled to flange 608 via weld joint 610. Conductor 612 extends into air gap 613, through the primary seal 602 and into antenna adapter 614. The antenna adapter 614 is positioned partially within recess 616 formed in the wetted surface of the primary seal 602.

Antenna adapter 614 is held in place and attached to the primary seal 602 by a support band 620, which extends around an entire circumference of the antenna adapter 614 and is brazed to both the primary seal 602 and the antenna adapter 614. The brazed support band 620 is brazed to the primary seal 602 on one edge and to the circumferential edge of the antenna adapter 614, thereby sealing the conductor 612 from the process fluid.

In this embodiment, the brazed annular support band 620 completes the hermetic seal and attaches the antenna adapter 614. Additionally, the brazed support band 620 provides a structural support to the base of the antenna adapter 614, essentially distributing bending and shear moments away from the conductor 612. In general, the brazed support band 620 may be formed from any corrosion resistant and heat resistant material that can be formed to fit around the antenna adapter 614. In a preferred embodiment, the brazed support band 620 is formed from stainless steel and is brazed with a gold/nickel braze material having a composition of 82%/18%, respectively.

In general, the present invention has been described with respect to a ceramic seal brazed in a stainless steel body, which is welded within a flange for attachment to a tank. In a preferred embodiment, the weld material used to create weld joints between stainless steel elements of the assembly is a duplex (ferritic/austenitic) 2205 stainless steel, a 316L stainless steel, or a Hastelloy weld material. Other materials may also be used, provided such materials have similar corrosion and heat resistant properties.

The primary and secondary seals of the present invention are preferably impedance matched hermetic seals. By brazing a braze band to the ceramic primary seal and welding the braze band into the stainless steel body, the assembly is capable of effectively sealing corrosive atmospheres at pressures and temperatures greater than 2000 psi and 750 degrees F.

In general, the primary seal isolates the electronics and the adapter chamber from the process material and from the heat and pressure of the material within the tank. The secondary seal is impedance matched to the primary seal and provides a secondary process barrier, a flamepath and an environmental barrier. The secondary seal may be formed from a conventional glass-metal design, a potting material such as epoxy or alternatively may use a ceramic to metal seal design (such as that used with the primary seal).

Although the present invention has been described with reference to preferred embodiments, workers skilled in the art will recognize that changes may be made in form and detail without departing from the spirit and scope of the invention.

What is claimed is:

1. A microwave level gauge for measuring a level of a process fluid in a tank with a tank atmosphere, the microwave level gauge comprising:
    a hollow adapter body extending from a lower portion that is open to the tank atmosphere to a transmitter mount outside the tank;
    a connector rod extending from the lower portion and connectable to an antenna in the tank;
    conductors coupled between the connector rod and the transmitter mount such that microwaves are couplable from the antenna to the transmitter mount; and
    a primary seal in the lower portion that includes a lower support band brazed to an outer surface of a ceramic seal body, and an upper support band brazed to an outer surface of the ceramic seal body and sealingly joined to the adapter body such that the primary seal contacts the tank atmosphere and seals the conductors from the tank atmosphere.

2. The microwave level gauge of claim 1 wherein the conductors comprise:
    a threaded rod fastened to the connector rod and extending up through a central passageway in the ceramic seal body to an upper threaded end; and
    a compression washer mounted to the upper threaded end and providing axial compression to the ceramic seal body.

3. The microwave level gauge of claim 2 further comprising a secondary seal between the cavity and the transmitter mount, the secondary seal including a venting seal between the cavity and an atmosphere outside the tank, the venting seal venting the cavity to the atmosphere under fault conditions.

4. The microwave level gauge of claim 3 wherein the conductors comprise:
    a spring loaded pin contacting the threaded rod and extending through the secondary seal.

5. The microwave level gauge of claim 1 wherein braze joints between the upper and lower support bands and the ceramic seal body have a shrink fit that provides radial compression to the ceramic seal body.

6. The microwave level gauge of claim 1 wherein the adapter body comprises:
    a lower adapter body having a threaded upper end and an upper weld surface spaced apart from the threaded upper end;
    an upper adapter body having a threaded lower end and a lower weld surface spaced apart from the threaded lower end; and
    wherein the microwave level gauge further comprises:
    a metal coupler threaded into the threaded upper and lower ends such that the upper and lower adapter bodies are mechanically joined; and
    a weld between the upper and lower weld surfaces such that the upper and lower weld bodies are sealed to one another.

7. The microwave level gauge of claim 6 wherein the lower adapter body includes a transition from a larger internal diameter to a smaller internal diameter so that the transition partially reflects microwaves such that the transition produces a test pulse.

8. The microwave level gauge of claim 1 further comprising a threaded coupler nut that is threaded on the transmitter mount such that a transmitter can be attached to the transmitter mount in an arbitrary rotational position.

9. The microwave level gauge of claim 1 further comprising:
    a protective sheath around the antenna, the protective sheath being attached to the lower portion.

10. The microwave level gauge of claim 1 further comprising:
    a flange attached to the lower portion and having a flange surface that is sealable to a tank opening.

11. A microwave level gauge for measuring a level of a process material in a tank with a tank atmosphere, the microwave level gauge comprising:
    a housing coupled to an opening in the tank;
    a ceramic seal disposed within the housing and adjacent to the opening in the tank to isolate the housing from the tank atmosphere, the ceramic seal contacting the tank atmosphere;
    a microwave conductor extending from the housing and through the ceramic seal; and
    an isolating adapter extending over the microwave conductor and sealed to the ceramic seal, the isolating adapter and the ceramic seal sealing the microwave conductor from the tank atmosphere.

12. The microwave level gauge of claim 11 wherein the isolating adapter is sealed to the ceramic seal by brazing.

13. The microwave level gauge of claim 12 wherein the brazed seal extends an entire circumference of a coupling joint between the ceramic seal and the isolating adapter.

14. The microwave level gauge of claim 11 and further comprising:
    circuitry disposed outside of the tank and adapted to detect a reflected microwave signal.

15. The microwave level gauge of claim 11 and further comprising:
    a secondary seal disposed within the housing, the microwave conductor extending through the secondary seal, the secondary seal being generally impedance matched to the ceramic seal.

16. The microwave level gauge of claim 11 wherein the secondary seal is formed from glass.

17. The microwave level gauge of claim 12 wherein the brazed seal comprises a braze band that translates external forces away from the microwave conductor.

18. The microwave level gauge of claim 11 and further comprising:
a microwave antenna coupled to the isolating adapter and extending into the process material in the tank.

19. A microwave level gauge assembly for measuring a level of a process material in a tank with a tank atmosphere, the microwave level gauge assembly comprising:
a hermetic seal in contact with the tank atmosphere and fixed over a tank opening to isolate transmitter circuitry from the tank atmosphere, the hermetic seal comprising:
a ceramic seal body having an opening sized to receive a microwave conductor;
an isolating element disposed over the opening and coupled to the ceramic seal body at a coupling joint; and
a brazed seal disposed over the coupling joint for fixedly sealing the isolating element to the ceramic seal body; and
a microwave conductor extending through the opening and electrically coupled to the transmitter circuitry on one end and to the isolating element on an opposing end, the microwave conductor being sealed from the tank atmosphere by the hermetic seal.

20. The microwave level gauge assembly of claim 19 wherein the brazed seal is formed of a gold/nickel alloy.

21. The microwave level gauge assembly of claim 19 wherein the isolating element comprises:
an isolating body coupled to the ceramic seal body via an upper brazed seal; and
an antenna adapter coupled to the isolating body by a lower brazed seal.

22. The microwave level gauge assembly of claim 19 wherein the brazed seal extends around an entire circumference of the coupling joint.

23. The microwave level gauge assembly of claim 19 further comprising:
a housing coupled to the tank adjacent to the tank opening, the housing defining a chamber that is isolated from the process material by the hermetic seal.

24. The microwave level gauge assembly of claim 23 wherein the housing comprises:
a housing adapter body coupled to the tank;
a transmitter housing releasably coupled to the housing adapter by a coupler nut.

25. The microwave level gauge assembly of claim 24 further comprising:
a secondary seal disposed between the adapter body and the transmitter housing.

26. The microwave level gauge assembly of claim 25 wherein the secondary seal and the hermetic seal are impedance matched.

27. The microwave level gauge assembly of claim 24 further comprising:
a gasket disposed between the adapter body and the transmitter housing, the gasket for sealing a joint between the adapter body and the transmitter housing.

28. The microwave level gauge assembly of claim 24 further comprising:
an o-ring seal disposed between the adapter body and the transmitter housing.

29. The microwave level gauge of claim 19 wherein the brazed seal directs external forces along a wetted surface of the isolating adapter and the seal body and away from the microwave conductor.

30. A microwave level gauge for measuring a level of a process fluid in a tank having a tank atmosphere, the microwave level gauge comprising:
a ceramic seal disposed in a tank opening and contacting the tank atmosphere, and adapted to seal the tank opening; and
a microwave conductor extending through the ceramic seal and into the tank, the microwave conductor being sealed to the ceramic seal at a brazed joint such that the ceramic seal seals the microwave conductor from the tank atmosphere.

31. The microwave level gauge of claim 30 wherein the microwave conductor comprises:
a thin-walled tube formed from a corrosion resistive material; and
a conductive alloy disposed within the thin-walled tube and formed from a material having a low coefficient of expansion with respect to temperature.

32. The microwave level gauge of claim 31 wherein the conductive alloy comprises Kovar® or Alloy 52.

33. The microwave level gauge of claim 30 further comprising:
a coaxial tube coupled to the tank and disposed around the microwave conductor in the tank to protect the microwave conductor from external forces.

34. The microwave level gauge of claim 33 and further comprising:
a support structure coupled to an inside surface of the coaxial tube and adapted to center the microwave conductor within the coaxial tube.

35. A microwave level gauge for measuring a level of a process fluid in a tank having a tank atmosphere, the microwave level gauge comprising:
a microwave conductor electrically coupled to process circuitry outside of the tank and extending through a tank opening disposed in a portion of the tank; and
a seal disposed in the tank opening and contacting the tank atmosphere, and extending over the microwave conductor to isolate the microwave conductor from the tank atmosphere.

36. The microwave level gauge of claim 35 wherein the seal comprises:
a ceramic seal body disposed in the tank opening, the ceramic seal body defining a conductor opening sized to receive the microwave conductor; and
an isolating adapter disposed over the conductor opening and sealed to the ceramic seal body, the isolating adapter electrically coupled to the microwave conductor.

37. The microwave level gauge of claim 36 wherein the isolating adapter comprises:
an adapter body sealed to the ceramic seal body; and
an antenna adapter sealed to the adapter body, the antenna adapter coupled to the microwave conductor.

38. The microwave level gauge of claim 36 further comprising:
a corrosion resistant band disposed around a portion of the isolating adapter adjacent to a joint between the isolating adapter and the ceramic seal, the band being brazed to seal the isolating adapter to the ceramic seal.

39. The microwave level gauge of claim 35 wherein the ceramic seal isolates the microwave conductor from external forces.

* * * * *